United States Patent
Negre et al.

(10) Patent No.: US 6,363,723 B1
(45) Date of Patent: Apr. 2, 2002

(54) METHOD AND DEVICE FOR REACCLERATING A VEHICLE EQUIPPED WITH HIGH-PRESSURE AIR COMPRESSORS

(75) Inventors: Guy Negre, Forum Aurelia, Route du Val, 83170; Cyril Negre, both of Brignoles (FR)

(73) Assignee: Guy Nègre (FR)

( * ) Notice: Subject to any disclaimer, the term of this patent is extended or adjusted under 35 U.S.C. 154(b) by 0 days.

(21) Appl. No.: 09/284,144

(22) PCT Filed: Oct. 6, 1997

(86) PCT No.: PCT/FR97/01766

§ 371 Date: Jun. 7, 1999

§ 102(e) Date: Jun. 7, 1999

(87) PCT Pub. No.: WO98/15440

PCT Pub. Date: Apr. 16, 1998

(30) Foreign Application Priority Data

Oct. 7, 1996 (FR) .............................. 96/12168

(51) Int. Cl.⁷ .............................. F07B 75/02; F02G 3/02
(52) U.S. Cl. .......................... 60/712; 60/39.6; 180/302
(58) Field of Search .................. 60/39.6, 712; 180/302; 123/22

(56) References Cited

U.S. PATENT DOCUMENTS

| 3,913,699 A | * 10/1975 | Dyer |
| 4,361,204 A | * 11/1982 | Earle ........................... 180/302 |
| 4,433,549 A | * 2/1984 | Zappia ......................... 123/22 |
| 4,798,053 A | * 1/1989 | Chang |
| 5,638,681 A | * 6/1997 | Rapp ............................ 60/712 |
| 6,094,915 A | * 8/2000 | Negre et al. .................. 60/712 |

FOREIGN PATENT DOCUMENTS

| FR | 2253916 | * 7/1975 |
| GB | 1357696 | * 6/1974 |

* cited by examiner

Primary Examiner—Michael Koczo
(74) Attorney, Agent, or Firm—Duane Morris; Arthur L. Plevy

(57) ABSTRACT

A method and device for reaccelerating a vehicle equipped with a compressor supplying high-pressure compressed air for cleansed or cleansing engine is provided, in which, during decelerating and/or braking phases, the on-board compressor being operated, the high pressure compressed air flow is derived and stored in a reaccelerating reservoir, thermally insulated and maintained at very high pressure and very high temperature, to be used when the vehicle is put back in driving phase by being injected at high temperature and at high pressure in the combustion chamber of the engine.

20 Claims, 2 Drawing Sheets

METHOD AND DEVICE FOR REACCLERATING A VEHICLE EQUIPPED WITH HIGH-PRESSURE AIR COMPRESSORS

The invention relates to land vehicles, and, more particularly, those equipped with pollutant-free or pollution-controlling engines having an independent combustion chamber.

The author, in his published Patent Application WO 96/27737, described a method for the pollution control of an engine having an independent external combustion chamber, operating according to a bi-modal principle with two types of energy, using either a conventional fuel of the petrol or gas-oil type on the highway (mono-modal operation with air/fuel) or, at low speed, especially in urban and suburban areas, an addition of compressed air (or of any other non-pollutant gas), to the exclusion of any other fuel (mono-modal operation with air, that is to say with the addition of compressed air). In his French Patent Application 96/07714, filed on Jun. 17, 1996, now French Patent 2 749 882 the author described the installation of this type of engine operating mono-modally, with the addition of compressed air, on service vehicles, for example urban buses.

In this type of engine, in the air/fuel mode, the air/fuel mixture is sucked up and compressed in an independent suction and compression chamber. This mixture is then transferred, still under pressure, into an independent and constant volume combustion chamber, so as to be ignited there, in order to increase the temperature and pressure of the said mixture. After the opening of a transfer connecting the said combustion chamber to a depressurization and exhaust chamber, this mixture will be depressurized into the latter so as to carry out work there. The depressurized gases are subsequently discharged into the atmosphere through an exhaust pipe.

In low-power air operation, the fuel injector is no longer activated; in this case, a small quantity of additional compressed air, coming from an external reservoir where the air is stored under high pressure, for example 200 bar, and at ambient temperature, is introduced into the combustion chamber, substantially after the compressed air, without fuel, coming from the suction and compression chamber has been admitted into the said combustion chamber. This small quantity of compressed air, at ambient temperature, will heat up in contact with the high-temperature air mass contained in the combustion or expansion chamber and will expand and increase the pressure prevailing in the chamber, in order to carry out motive work during depressurization.

This type of bi-modal or bi-energy engine (air and petrol or air and additional compressed air) may also be modified for preferred town use, for example on all vehicles and, more particularly, on urban buses or other service vehicles (taxis, refuse lorries, etc.), in the air/compressed-air mono-mode, by omitting all the elements of the engine which operate with traditional fuel.

The engine operates, in mono-mode only, with the injection of additional compressed air into the combustion chamber which thus becomes a combustion chamber. Moreover, the air sucked in by the engine can be filtered and purified through one or more charcoal filters or filters using another mechanical or chemical method, a molecular sieve or other filters, in order to produce a pollution-controlling engine. The use of the term "air" in the present text refers to "any non-pollutant gas".

In his French Patent Application 9611632, the author also described the installation of on-board high-pressure compressors for recharging with compressed air the reservoir of the vehicle equipped with engines, such as those described above, the compressor being driven by an autonomous motor with an autonomous energy source and being engaged on the transmission in order to operate and replenish the reserves of compressed air of the vehicle during slowing and braking, thus making it possible to recover considerable energy dissipated during these operations.

However, in this type of installation, the high-pressure and high-temperature compressed air fills the main reservoir which is substantially at ambient temperature and is cooled. This solution causes the loss of a large part of its energy, especially when the reservoir begins to empty, thus bringing about a loss of its pressure due to depressurization.

The method according to the invention proposes another solution which makes it possible, in addition, to make available an additional torque and an additional power reserve during accelerations. It is characterized by the means employed and, more particularly, in that, during decelerations and braking, the high-pressure compressor, which is activated by a clutch or any other coupler, then serves as a retarder, or even as a brake, by generating compressed air at a high pressure of, for example, 200 bar and at high temperature. This compressed air is diverted and stored in a reservoir, heat-insulated or not, called the reacceleration reservoir, where the compressed air is maintained at high temperature and high pressure, so as to be utilized as soon as the vehicle is put into action again, by being injected into the combustion chamber of the engine. This compressed air, which has thus preserved most of its temperature and pressure due to the short dwell time in the reacceleration reservoir, is reinjected, hot, into the combustion chamber of the engine and provides a considerably larger amount of energy when the vehicle is put into action again or restarted. The capacity of the heat-insulated reacceleration reservoir, as well as the pressure of the air contained in it, is provided according to requirements, and, when the reacceleration reservoir is full, the air is once again diverted towards the main reservoir.

The average person skilled in the art can calculate the volume and pressure of the reacceleration reservoir as a function of the average frequency and average intensity of the brakings and accelerations, depending on the intended use.

According to a preferred characteristic of the invention, the reacceleration reserve is produced in a variable-volume system, in order, as soon as it begins to be filled, to maintain the compressed air stored in it at a virtually constant pressure and temperature, by means of a device assisted by mechanical, pneumatic or hydraulic systems, such as springs or the like, and, more particularly, by means of a device utilizing the compressed air under pressure in the main reservoir, after the said air has been depressurized to a specific pressure. This variable-volume heat-insulated reacceleration capacity thus prevents the falls in pressure and temperature of the compressed air while it is being filled and makes it possible, at any moment, to have available a quantity of air at the desired high pressure and at high temperature, so as to make it possible to put the vehicle into action again, without waiting until the reacceleration capacity is filled completely in order to reach the desired service pressure (for example, 100 bar).

Thus, shortly after slowing or braking, when the vehicle driver wants to reaccelerate, a quantity of compressed air at high pressure and high temperature, extracted from the reacceleration capacity, is injected into the combustion chamber, making it possible to obtain very high pressures in the said chamber, these being tokens of torque and power.

Numerous means for maintaining the temperature in the reacceleration reservoir may be employed, and mention may be made, for example, of: the use of ceramic or of a heat-insulating method, such as glass wool or the like, and it is conceivable to produce non-polluting thermal or chemical heating systems, without thereby departing from the method according to the invention.

Other objects, advantages and characteristics of the invention may be gathered from reading the non-limiting description of one embodiment, the said description referring to the accompanying drawings in which.

Figure 1:
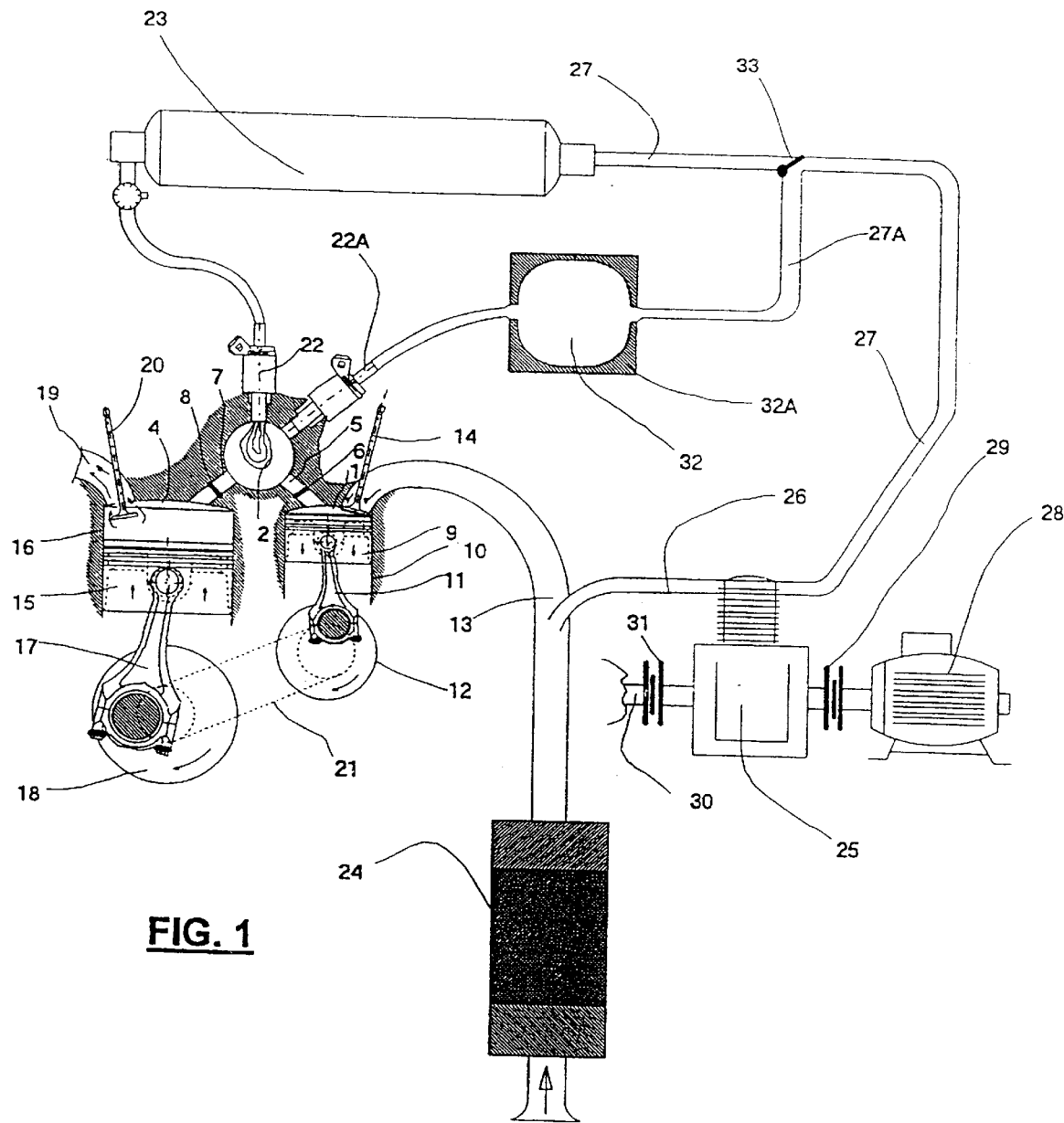
FIG. 1 shows a basic installation diagram including a reacceleration reserve according to the invention.

FIG. 1 shows, schematically, a basic installation diagram of a pollution-controlling engine comprising a suction and compression chamber 1, a constant-volume combustion chamber 2, in which is fitted an additional-air injector 22 fed with compressed air stored in a reservoir 23 under very high pressure, and a depressurization and exhaust chamber 4. The suction and compression chamber 1 is connected to the combustion chamber 2 via a pipe 5, the opening and closing of which are controlled by a leak-tight flap 6. The combustion chamber 2 is connected to the depressurization and exhaust chamber 4 via a pipe or transfer 7, the opening and closing of which are controlled by a leak-tight flap 8. The suction and compression chamber 1 is fed with air via an intake pipe 13, the opening of which is controlled by a valve 14 and upstream of which is fitted a pollution-controlling charcoal filter 24.

The suction and compression chamber 1 operates as a to piston compressor assembly, in which a piston 9 sliding in a cylinder 10 is controlled by a connecting rod 11 and a crankshaft 12. The depressurization and exhaust chamber 4 controls a conventional piston engine assembly, with a piston 15 which slides in a cylinder 16 and which causes the rotation of a crankshaft 18 by means of a connecting rod 17. The exhaust of the depressurized air takes place via an exhaust pipe 19, the opening of which is controlled by a valve 20. The rotation of the crankshaft 12 of the suction and compression chamber 1 is controlled by the engine crankshaft 18 of the depressurization and exhaust chamber 4 via a mechanical connection 21. The on-board compressor 25 has its air intake 26 branched to the intake pipe of the engine 13 between the filtering system 24 of the engine and the engine itself. During the rotation of the said compressor, it will fill the reserves of high-pressure compressed air 23, installed on the vehicle, with compressed air via its exhaust pipe 27. The compressor 25 is driven by an electric motor 28 via a clutch 29 which is actuated in order to fill the reserves.

The compressor 25 is also connected to the vehicle transmission 30, likewise via a clutch 31 which will be actuated (engaged) during decelerations and brakings and which will serve as an engine brake, making it possible to slow the vehicle and fill a reacceleration reservoir 32 35 with high-pressure and high-temperature compressed air via a branched pipe 27A, the said reacceleration reservoir advantageously being surrounded by a heat-insulating casing 32A. A valve 33, arranged on the exhaust pipe of the compressor 27, diverts the compressed-air stream towards this reacceleration reserve via a branched pipe 27A, by shutting off the pipe 27, and, when the reacceleration reservoir is completely full, makes it possible, if necessary, for the on-board compressor to operate during braking and/or deceleration, via the pipe 27, by shutting off the branched pipe 27A and by directing the stream towards the main reservoir 23. The valve 33 also shuts off the pipe 27A during reacceleration, in order to convey the stream of compressed air under pressure, contained in the reacceleration reservoir 32 towards the reacceleration injector 22A, when the on-board compressor 25 is disengaged, at the same time preventing pressure losses in the direction of the on-board compressor 25 and/or of the main external reservoir 23.

After the deceleration, braking and/or stopping of the vehicle, during acceleration in order to put the said vehicle into action again, an air injector 22A is actuated, so as to make it possible to inject high-pressure and high-temperature compressed air into the combustion chamber. This air will mix with the compressed air in the compression chamber 1 and is transferred into the combustion chamber of the engine, and will considerably increase the pressure, so as to have high power available for putting the vehicle into action again.

Figure 2:
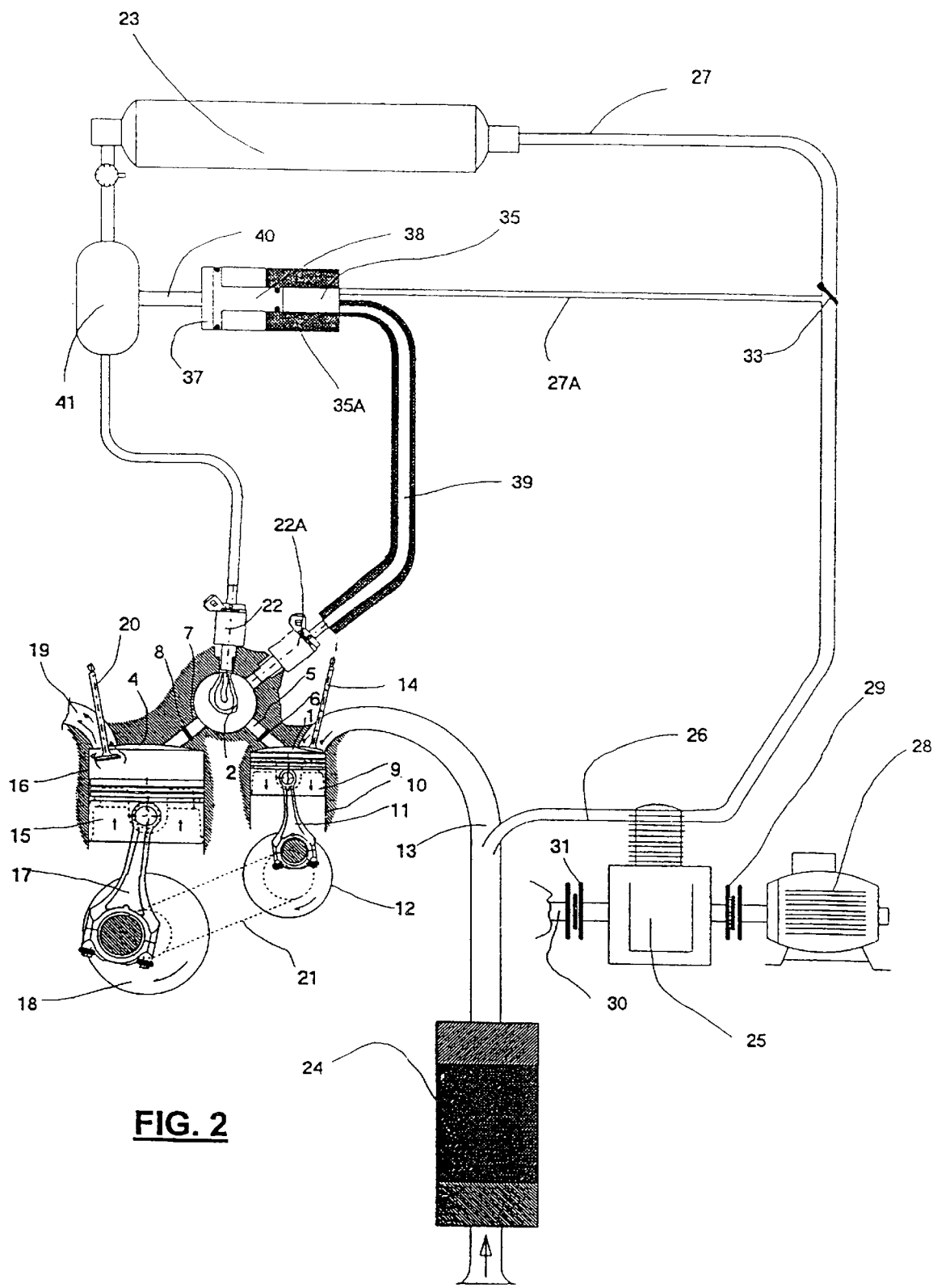
FIG. 2 shows a view in longitudinal section of a similar installation, with a variable-volume and constant-pressure reacceleration capacity and its system for maintaining pressure and temperature.

FIG. 2 shows a basic installation diagram, with a variable-volume reacceleration reservoir device according to a variant of the invention, with a pressure-regulating system managed by the compressed-air pressure prevailing in the main reservoir 23. The reacceleration reservoir 35, advantageously surrounded by its thermal insulation 35A, consists of a hollow cylinder of small diameter, opening concentrically into a hollow cylinder of larger diameter 37, a two-stage piston 38 sliding sealingly in the said cylinders. The cylinder of small diameter is the reacceleration reservoir 35, connected to the intake pipe 27A for high-pressure compressed air coming from the on-board compressor 25, which is actuated during decelerations and/or braking, and to the pipe 39 for the outlet of compressed air towards the reacceleration injector 22A. The cylinder of large diameter 37 comprises an intake 40 for medium-pressure compressed air which comes from the main reservoir under very high pressure 23 and which is depressurized in a medium-pressure buffer capacity 41 necessary and sufficient for feeding additional air to the injector 22 when the engine is operating normally.

The ratio of the diameters of the cylinders is calculated in such a way that the pressure depressurized into the cylinder of larger diameter 37 makes it possible, in the small cylinder, to maintain the selected pressure for feeding the reacceleration additional-air injector 22A. For example, a large cylinder of a diameter of 100 mm, receiving a depressurized pressure of 40 bar, makes it possible to maintain a pressure of approximately 110 bar in a small cylinder of a diameter of 60 mm, which forms the reacceleration reservoir. So as to avoid a high pressure difference during the displacement of the piston 38, the buffer capacity 41 will be selected so as to have a relatively large volume.

During operation in the compressed-air mode, the engine is fed with additional air, at 40 bar (for example) and at ambient temperature, by the additional-air injector 22.

During a deceleration, that is to say as soon as the driver relaxes his pressure on the accelerator or during braking, the clutch 31 is activated and the on-board air compressor 25 is put into action and ensures slowing or braking. The diverting valve 33 is positioned so as to divert the air, compressed at high pressure (for example 150 bar) and high temperature by the compressor 25, towards the reacceleration reservoir 35. Under the effect of the intake of the compressed air via the pipe 27A, the two-stage piston 38 is displaced and, by virtue of the force exerted on its face of large diameter by the pressure prevailing in the large cylinder 37, maintains a virtually constant pressure (for example 100 bar) in the reacceleration reservoir 35. When the piston 38 has reached the end of its travel, the valve 33 is actuated once again in order to direct the compressed air towards the main reservoir 23. It is thus possible to slow and/or brake the vehicle, at the same time operating the on-board compressor 25 by directing the compressed-air stream in the direction of the main external reservoir 23. As soon as the driver wants to reaccelerate, the reacceleration injector 22A is actuated in order to feed hot high-compressed air to the combustion chamber 2, thus making it possible to obtain a very high pressure, hence a high reacceleration torque, in the said chamber. In this operating phase, the valve 33 is positioned in such a way that it shuts off the branched pipe 27A, in order to make it possible to convey the stream of compressed air under pressure, contained in the reacceleration reservoir 35, towards the reacceleration injector 22A while the on-board compressor 25 is disengaged, thus preventing pressure losses in the direction of the on-board compressor 25 and/or of the main external reservoir 23. It is within the normal province of the average person skilled in the art to integrate the injection and valve-actuating commands as a function of the braking and acceleration phases described.

The type of high-pressure on-board compressor, the type of control clutch, the type of heat insulation of the reacceleration capacity, the type of diverting valve 33, the method of maintaining pressure, etc., and the various arrangements of the elements in the vehicle, may vary, without thereby departing from the scope of the present invention.

What is claimed is:

1. A reacceleration method for a vehicle equipped with a pollutant-free or pollutant-controlling engine, comprising an external combustion chamber (2), into which, in operation with air, a quantity of additional compressed non-pollutant gas, coming from a main external reservoir (23) in which this compressed gas is stored under high pressure and substantially at ambient temperature, is introduced substantially after the compressed air, without fuel, coming from a suction and compression chamber (1) has been admitted into the said combustion chamber, this vehicle also being equipped with a high-pressure on-board compressor (25) activated during decelerations and brakings, so as to fill the main external reservoir (23), wherein the air, compressed at high pressure by the compressor (25), is diverted to a reacceleration reservoir and stored in order to be maintained at high temperature and high pressure, and in that this air is utilized as soon as the vehicle is put into action again or restarted, by being injected into the combustion or expansion chamber of the engine (2).

2. The method according to claim 1, wherein the storage of the compressed air is carried out at a set volume.

3. The method according to claim 1, wherein the storage of the air is carried out at a variable volume, in order, as soon as filling commences, to obtain and maintain a virtually constant pressure and temperature of the air which are substantially close to those supplied by the on-board compressor.

4. The method, according to claim 3, wherein the control of the increase and variation of the volume of stored air utilizes the compressed air of the main external reservoir (23).

5. The method according to claim 1, wherein the reacceleration reservoir is thermally insulated or is produced from insulating materials in order to maintain a high temperature and pressure.

6. A device for implementing the method according to claim 1, wherein the storage of the compressed air coming from the on-board compressor (25) is carried out in a reacceleration reservoir (32, 35) branched to the exhaust pipe (27) of the on-board compressor (25) between the said pipe and an injector (22A) positioned in the combustion chamber (2).

7. The device according to claim 6, wherein the reacceleration reservoir is a reservoir of set volume (32).

8. The device according to claim 6, wherein the reacceleration reservoir is of variable volume (35).

9. The device according to claim 8, wherein the reacceleration reservoir consists of a hollow cylinder of small diameter (35) opening concentrically into a hollow cylinder of larger diameter (37), a two-stage piston (38) sliding in the said cylinders, whilst the cylinder of small diameter (35) is connected, on the one hand, to the intake pipe (27) for compressed air from the high-pressure on-board compressor (25) via a branched pipe (27A) and, on the other hand, to a reacceleration injector (22A), and in that the cylinder of larger diameter (37) comprises an intake (40) for medium-pressure compressed air which comes from the main reservoir under very high pressure (23) and which is depressurized in a buffer capacity (41), whilst the ratio of the diameters of the cylinders is calculated in such a way that the medium pressure prevailing in the cylinder of large diameter (37) makes it possible, in the small cylinder (35) which is the reacceleration reservoir, to maintain the selected high pressure for feeding the reacceleration additional-air injector (22A).

10. The device according to claim 6, wherein the exhaust pipe of the on-board compressor (27) and the pipe (27A) branched towards the reacceleration reservoir are equipped with a valve (33) which makes it possible, on the one hand, during decelerations and/or brakings, to divert the air stream coming from the on-board compressor (25) in the direction of the main external reservoir (23), by opening the branched pipe (27A) and by shutting off the exhaust pipe (27) of the on-board compressor (25), and, on the other hand, to make it possible to shut off the branched pipe (27A), either in order to allow the free passage of the compressed-air stream in the direction of the main external reservoir (23) or, when the reacceleration reservoir (35) is full, to make it possible to utilize the on-board compressor (25) in order to slow and brake the vehicle, or, during reaccelerations, to convey the stream of compressed air under pressure, contained in the reacceleration reservoir (35), towards the reacceleration injector (22A), while the on-board compressor (25) is disengaged, thus preventing the pressure losses in the direction of the on-board compressor (25) and/or the main external reservoir (23).

11. The method according to claim 2, wherein the reacceleration reservoir is thermally insulated or is produced from insulating materials in order to maintain a high temperature and pressure.

12. The method according to claim 3, wherein the reacceleration reservoir is thermally insulated or is produced from insulating materials in order to maintain a high temperature and pressure.

13. The method according to claim 4, wherein the reacceleration reservoir is thermally insulated or is produced from insulating materials in order to maintain a high temperature and pressure.

14. A device for implementing the method according to claim 2, wherein the storage of the compressed air coming from the on-board compressor (25) is carried out in a reacceleration reservoir (32, 35) branched to the exhaust pipe (27) of the on-board compressor (25) between the said pipe and an injector (22A) positioned in the combustion chamber (2).

15. A device for implementing the method according to claim 3, wherein the storage of the compressed air coming from the on-board compressor (25) is carried out in a reacceleration reservoir (32, 35) branched to the exhaust pipe (27) of the on-board compressor (25) between the said pipe and an injector (22A) positioned in the combustion chamber (2).

16. A device for implementing the method according to claim 4, wherein the storage of the compressed air coming from the on-board compressor (25) is carried out in a reacceleration reservoir (32, 35) branched to the exhaust pipe (27) of the on-board compressor (25) between the said pipe and an injector (22A) positioned in the combustion chamber (2).

17. A device for implementing the method according to claim 5, wherein the storage of the compressed air coming from the on-board compressor (25) is carried out in a reacceleration reservoir (32, 35) branched to the exhaust pipe (27) of the on-board compressor (25) between the said pipe and an injector (22A) positioned in the combustion chamber (2).

18. The device according to claim 7, wherein the exhaust pipe of the on-board compressor (27) and the pipe (27A) branched towards the reacceleration reservoir are equipped with a valve (33) which makes it possible, on the one hand, during decelerations and/or brakings, to divert the air stream coming from the on-board compressor (25) in the direction of the main external reservoir (23), by opening the branched pipe (27A) and by shutting off the exhaust pipe (27) of the on-board compressor (25), and, on the other hand, to make it possible to shut off the branched pipe (27A), either to allow the free passage of the compressed-air stream in the direction of the main external reservoir (23) or, when the reacceleration reservoir (35) is full, to make it possible to utilize the on-board compressor (25) in order to slow and brake the vehicle, or, during reaccelerations, to convey the stream of compressed air under pressure, contained in the reacceleration reservoir (35), towards the reacceleration injector (22A), while the on-board compressor (25) is disengaged, thus preventing the pressure losses in the direction of the on-board compressor (25) and/or the main external reservoir (23).

19. The device according to claim 8, wherein the exhaust pipe of the on-board compressor (27) and the pipe (27A) branched towards the reacceleration reservoir are equipped with a valve (33) which makes it possible, on the one hand, during decelerations and/or brakings, to divert the air stream coming from the on-board compressor (25) in the direction of the main external reservoir (23), by opening the branched pipe (27A) and by shutting off the exhaust pipe (27) of the on-board compressor (25), and, on the other hand, to make it possible to shut off the branched pipe (27A), either to allow the free passage of the compressed-air stream in the direction of the main external reservoir (23) or, when the reacceleration reservoir (35) is full, to make it possible to utilize the on-board compressor (25) in order to slow and brake the vehicle, or, during reaccelerations, to convey the stream of compressed air under pressure, contained in the reacceleration reservoir (35), towards the reacceleration injector (22A), while the on-board compressor (25) is disengaged, thus preventing the pressure losses in the direction of the on-board compressor (25) and/or the main external reservoir (23).

20. The device according to claim 9, wherein the exhaust pipe of the on-board compressor (27) and the pipe (27A) branched towards the reacceleration reservoir are equipped with a valve (33) which makes it possible, on the one hand, during decelerations and/or brakings, to divert the air stream coming from the on-board compressor (25) in the direction of the main external reservoir (23), by opening the branched pipe (27A) and by shutting off the exhaust pipe (27) of the on-board compressor (25), and, on the other hand, to make it possible to shut off the branched pipe (27A), either to allow the free passage of the compressed-air stream in the direction of the main external reservoir (23) or, when the reacceleration reservoir (35) is full, to make it possible to utilize the on-board compressor (25) in order to slow and brake the vehicle, or, during reaccelerations, to convey the stream of compressed air under pressure, contained in the reacceleration reservoir (35), towards the reacceleration injector (22A), while the on-board compressor (25) is disengaged, thus preventing the pressure losses in the direction of the on-board compressor (25) and/or the main external reservoir (23).

\* \* \* \* \*